United States Patent
Moawad et al.

(10) Patent No.: US 10,778,901 B2
(45) Date of Patent: Sep. 15, 2020

(54) CAMERA ADJUSTMENT SYSTEM

(71) Applicant: APTIV TECHNOLOGIES LIMITED, St. Michael (BB)

(72) Inventors: Mohamed A. Moawad, Kokomo, IN (US); Ehsan Samiei, Kokomo, IN (US); Walter K. Kosiak, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 152 days.

(21) Appl. No.: 16/021,686

(22) Filed: Jun. 28, 2018

(65) Prior Publication Data

US 2020/0007775 A1    Jan. 2, 2020

Related U.S. Application Data

(60) Provisional application No. 62/690,488, filed on Jun. 27, 2018.

(51) Int. Cl.
*B60W 30/12* (2020.01)
*H04N 5/232* (2006.01)
*G06K 9/00* (2006.01)
*G06K 9/32* (2006.01)

(52) U.S. Cl.
CPC ..... *H04N 5/23296* (2013.01); *G06K 9/00798* (2013.01); *G06K 9/3233* (2013.01); *B60W 30/12* (2013.01); *B60W 2554/00* (2020.02)

(58) Field of Classification Search
CPC .......... H04N 5/23296; G06K 9/00798; G06K 9/3233; B60W 30/12; B60W 2550/20
USPC ........................................................ 348/148
See application file for complete search history.

(56) References Cited

U.S. PATENT DOCUMENTS

| | | | |
|---|---|---|---|
| 9,535,423 B1* | 1/2017 | Debreczeni | G05D 1/0246 |
| 9,988,047 B2* | 6/2018 | Johnson | B60W 30/12 |
| 2010/0033571 A1 | 2/2010 | Fujita et al. | |
| 2013/0141520 A1 | 6/2013 | Zhang et al. | |
| 2018/0259961 A1* | 9/2018 | Prasad | G05D 1/0246 |
| 2019/0122378 A1* | 4/2019 | Aswin | G06N 3/08 |

OTHER PUBLICATIONS

European Search Report for Application No. 19178788.6, European Patent Office, dated Oct. 22, 2019.
Calibration of an embedded camera for driver-assistant systems, Mario Bellino et al.

* cited by examiner

*Primary Examiner* — William C Vaughn, Jr.
*Assistant Examiner* — Jae N Noh
(74) *Attorney, Agent, or Firm* — Colby Nipper PLLC (57) ABSTRACT

A camera adjustment system includes a camera, an actuator, an inertial-measurement-unit, and one or more controller-circuits. The camera renders an image of lane-markings of a roadway traveled by a host-vehicle. The actuator is operable for controlling an aim-direction of the camera. The inertial-measurement-unit detects relative-movement of the host-vehicle. The one or more controller-circuits are in communication with the camera, the actuator, and the inertial-measurement-unit. The one or more controller-circuits determine whether a range-of-detection of the lane-markings in the image is less than a detection-threshold and adjust the aim-direction based on the relative-movement.

41 Claims, 12 Drawing Sheets

CAMERA ADJUSTMENT SYSTEM

TECHNICAL FIELD OF INVENTION

This disclosure generally relates to a camera adjustment system, and more particularly relates to a camera adjustment system that changes an aim-direction of a camera.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
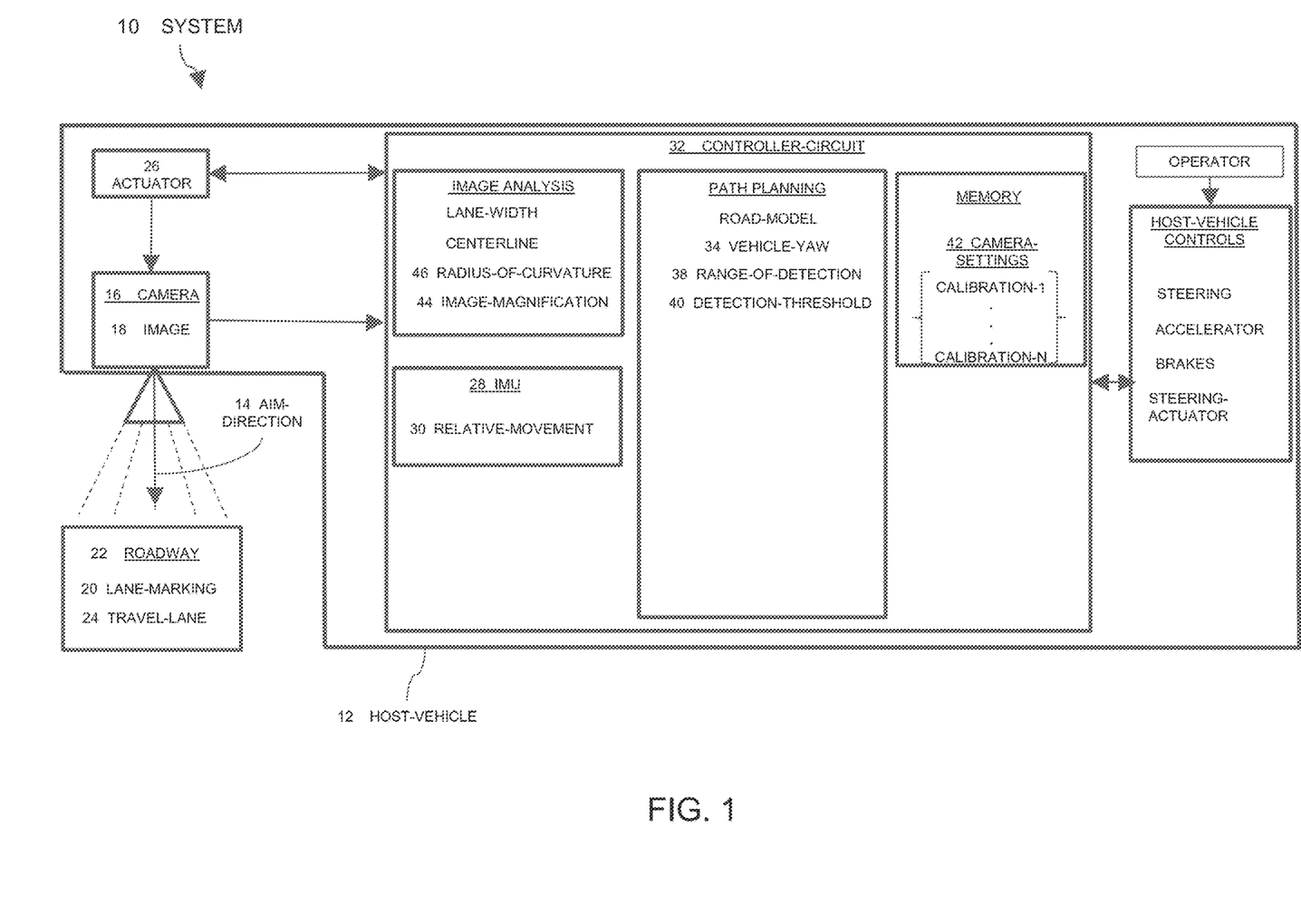
FIG. 1 is an illustration of a camera adjustment system in accordance with one embodiment.

FIG. 1 illustrates a camera adjustment system 10, hereafter referred to as the system 10, installed on a host-vehicle 12. As will be described in more detail below, the system 10 is an improvement on previous camera-adjustment-systems because the system 10 adjusts an aim-direction 14 of a camera 16, which may be beneficial in automated lane-keeping and/or lane-centering safety features that may be installed on the host-vehicle 12.

The system 10 includes the camera 16 that renders an image 18 of lane-markings 20 of a roadway 22 traveled by the host-vehicle 12. The camera 16 may be mounted on the front of the host-vehicle 12, or mounted in the interior of the host-vehicle 12 at a location suitable for the camera 16 to view the area around the host-vehicle 12 through the windshield of the host-vehicle 12. The camera 16 is preferably a video type camera 16 or camera 16 that can capture images of the roadway 22 and surrounding area at a sufficient frame-rate, of ten frames per second, for example.

The image 18 may include, but is not limited to, the lane-markings 20 on a left-side and right-side of a travel-lane 24 of the roadway 22 traveled by the host-vehicle 12. The image 18 may also include the lane-markings 20 on the left-side and the right-side of an adjacent-lane to the travel-lane 24. The lane-markings 20 may include a solid-line, as is typically used to indicate the boundary of the travel-lane 24 of the roadway 22. The lane-markings 20 may also include a dashed-line, as is also typically used to indicate the boundary of a travel-lane 24 of the roadway 22. The lane-markings 20 may become non-existent or otherwise undetectable by the camera 16 for a number of reasons such as, but not limited to, fading of the lane-marking-paint, erosion of the road surface, snow or dirt on the roadway 22, precipitation or dirt on the lens of the camera 16, operational failure of the camera 16, other-vehicles or objects on the roadway 22, saturation of an imager (not shown) of the camera 16 by a light-source, etc.

The system 10 also includes an actuator 26 operable for controlling the aim-direction 14 of the camera 16 on all three axes (i.e. x, y, and z axes). The actuator 26 may be any actuator 26 suitable for controlling the aim-direction 14, and may include one or more electric stepper-motors and/or servo-motors. The actuator 26 may also include a linkage-assembly between the one or more motors and the camera 16.

The system 10 also includes an inertial-measurement-unit 28 (IMU 28) that detects relative-movement 30 of the host-vehicle 12. The relative-movement 30 measured by the IMU 28 may include the host-vehicle's 12 current yaw-rate, longitudinal acceleration, lateral acceleration, pitch rate, and roll rate. One example of the several instances of the IMU 28 suitable for use on the host-vehicle 12 that are commercially available is the 6DF-1N6-C2-HWL from Honeywell Sensing and Control, Golden Valley, Minn., USA.

The system 10 also includes one or more controller-circuits 32 in communication with the camera 16, the actuator 26, and the IMU 28. The one or more controller-circuits 32 may include a processor (not specifically shown) such as a microprocessor or other control circuitry such as analog and/or digital control circuitry including an application specific integrated circuit (ASIC) for processing data as should be evident to those in the art. The one or more controller-circuits 32 may include a memory (not specifically shown), including non-volatile memory, such as electrically erasable programmable read-only-memory (EEPROM) for storing one or more routines, thresholds, and captured data. The one or more routines may be executed by the processor to perform steps for controlling the aim-direction 14 based on signals received from camera 16 and the IMU 28 by the one or more controller-circuits 32 as described herein.

The one or more controller-circuits 32 are generally configured (e.g. programmed or hardwired) to determine a centerline of the travel-lane 24 based on the lane-markings 20 of the roadway 22 detected by the camera 16. That is, the image 18 detected or captured by the camera 16 is processed by the one or more controller-circuits 32 using known techniques for image-analysis to determine where along the roadway 22 the host-vehicle 12 should be operated or be steered. Vision processing technologies, such as the EYE Q® platform from Moblieye Vision Technologies, Ltd. of Jerusalem, Israel, or other suitable devices may be used. By way of example, the centerline is preferably in the middle of the travel-lane 24 traveled by the host-vehicle 12.

Figure 2:
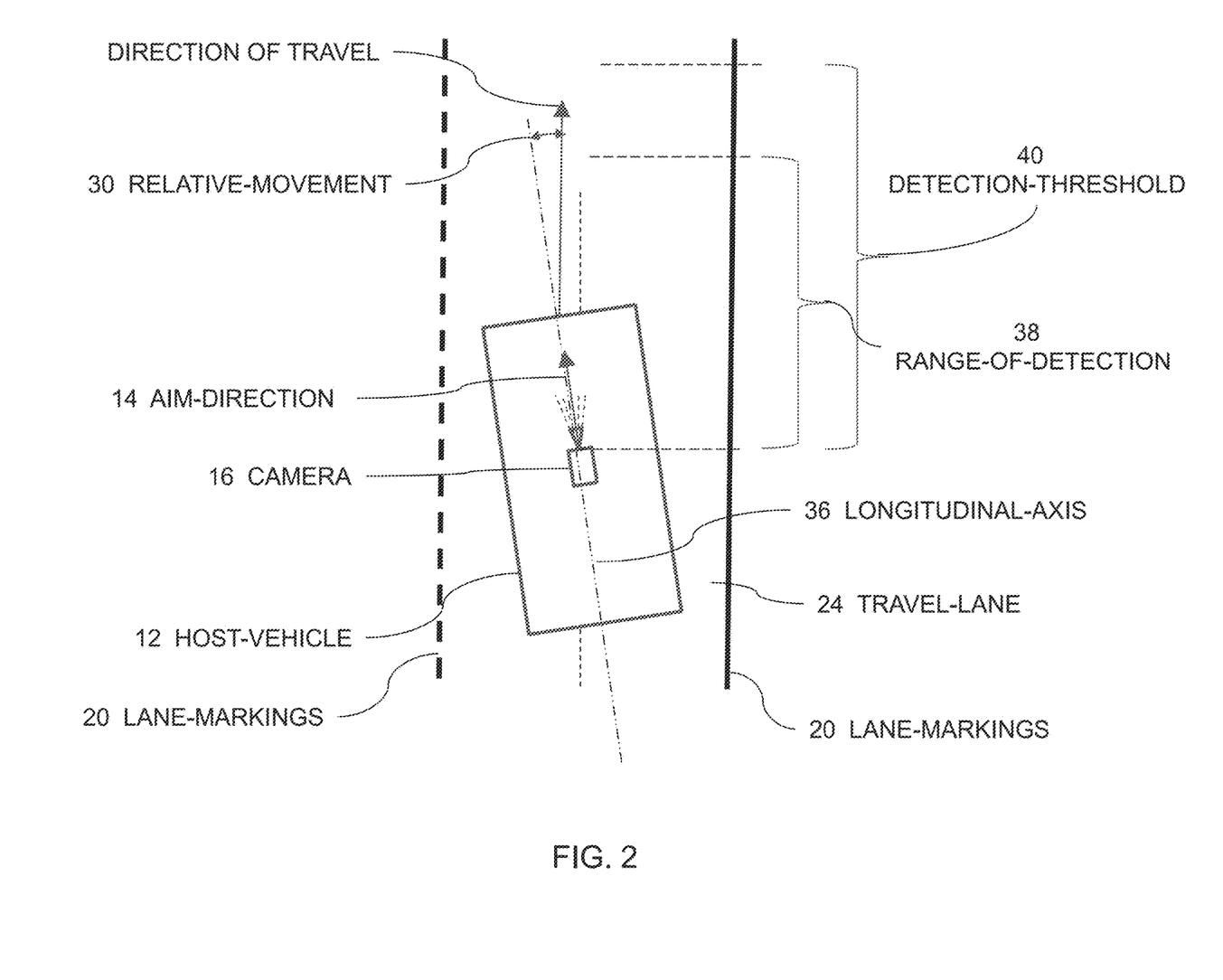
FIG. 2 is an illustration of a host-vehicle equipped with the camera adjustment system of FIG. 1 in accordance with one embodiment.

FIG. 2 illustrates a scenario where the host-vehicle 12 is equipped with the system 10 and is traveling in the travel-lane 24 and the relative-movement 30 (e.g. a vehicle-yaw 34) of the host-vehicle 12, as indicated by an angle between a longitudinal-axis 36 of the host-vehicle 12 and the direction of travel, is causing the camera 12 to point to the left of the travel-lane 24. The result is a reduction in a range-of-detection 38 of the lane-markings 20, specifically the right lane-marking 20 as it is outside the field-of-view of the camera 16 (i.e. the range-of-detection 38 is zero meters). The one or more controller-circuits 32 determine whether the range-of-detection 38 of the lane-markings 20 in the image 18 is less than a detection-threshold 40. The range-of-detection 38, as used herein, is a distance away from the host-vehicle 12 at which the system 10 is able to detect the lane-markings 20 in order to determine a lane-width of the travel-lane 24. A larger range-of-detection 38 is beneficial, as the one or more controller-circuits 32 may generate and update a road-model (not specifically shown) using the lane-markings 20 to assist in controlling the host-vehicle 12 in the travel-lane 24. The detection-threshold 40 may be user defined and is preferably less than 50-meters.

Figure 3:
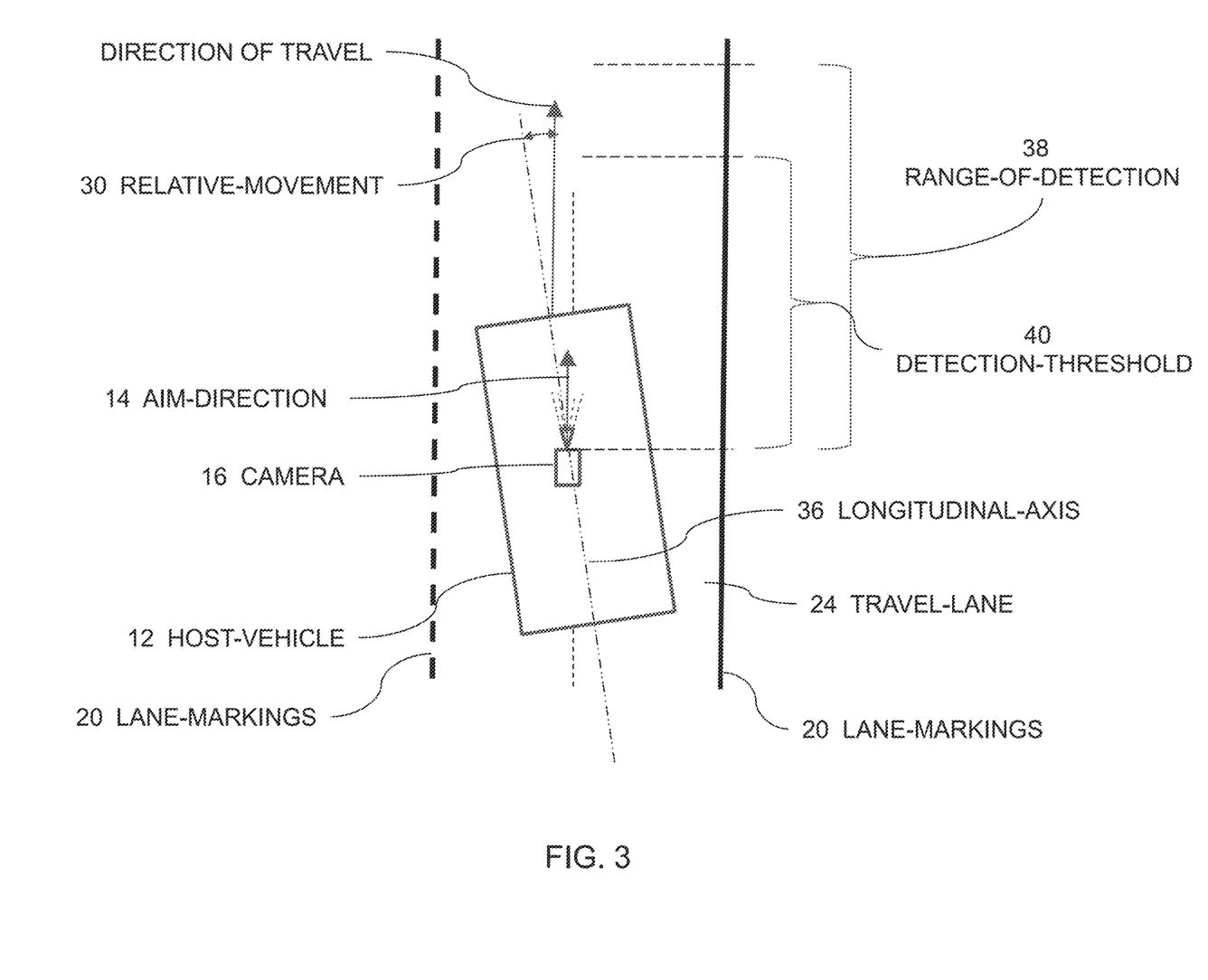
FIG. 3 is an illustration of the host-vehicle of FIG. 2 in accordance with one embodiment.

In accordance with the determination that the range-of-detection 38 is less than the detection-threshold 40, the one or more controller-circuits 32 adjusts the aim-direction 14 of the camera 16 based on the relative-movement 30 of the host-vehicle 12 detected by the IMU 28, such that the image 18 of the right lane-marking 20 is again detected beyond the detection-threshold 40, as illustrated in FIG. 3. While the examples illustrated in FIGS. 2-3 indicate relatively straight-sections of roadway 22, it will be appreciated that the system 10 is also beneficial on curved-sections of roadway 22, where the reduction of the range-of-detection 38 of the lane-markings 20 may be more pronounced with the relative-movement 30 of the host-vehicle 12.

In one embodiment the one or more controller-circuits 32 adjusts the aim-direction 14 based on the vehicle-yaw 34 detected by the IMU 28. That is, the one or more controller-circuits 32 moves the camera 16 an equivalent amount to offset the vehicle-yaw 34. This may, or may not result in the range-of-detection 38 being greater than the detection-threshold 40 due to traffic and/or road conditions.

In another embodiment, the one or more controller-circuits 32 adjusts the aim-direction 14 until the range-of-detection 38 is greater than the detection-threshold 40. This involves an iterative process where the one or more controller-circuits 32 adjusts the aim-direction 14 an incremental amount and determines the range-of-detection 38 and repeats the process until the range-of-detection 38 is greater than the detection-threshold 40. The adjustment of the aim-direction 14 may be user defined, and preferably the one or more controller-circuits 32 adjusts the aim-direction 14 in increments of less than one-degree between the iterations of determining the range-of-detection 38. In addition, the one or more controller-circuits 32 adjusts the aim-direction 14 at a rate of less than one-degree per 100-milliseconds, which allows sufficient time for the one or more controller-circuits 32 to determine whether the range-of-detection 38 is greater than the detection-threshold 40, and provides sufficient response-time for the system 10.

In another embodiment the one or more controller-circuits 32 recalibrates camera-settings 42 based on the aim-direction 14. As will be appreciated by those in the art, the camera-settings 42 may typically be calibrated in a vehicle assembly plant where the camera's 16 extrinsic parameters that link the camera-position and orientation to a calibration-plane (i.e. a rotation matrix and translation vector) are calibrated to one or more stationary targets in the field of view of the camera 16. These calibrations typically vary based on the aim-direction 14. A plurality of calibration files may be stored in the memory (e.g. a look-up table) of the one or more controller-circuits 32 for reference by the system 10 for each unique aim-direction 14. In another embodiment, the calibrations may be calculated for each aim-direction 14 based on an initial calibration of polynomial parameters.

In another embodiment, the system 10 further includes an image-magnification feature 44, and the one or more controller-circuits 32 increases a magnification of the image 18 thereby increasing the range-of-detection 38. In the example illustrated in FIG. 1, the image-magnification feature 44 is included in the image-analysis block of the one or more controller-circuits 32. In another embodiment, the image-magnification feature 44 is included in the camera 16, such as a zoom-feature of a camera-lens.

Figure 4:
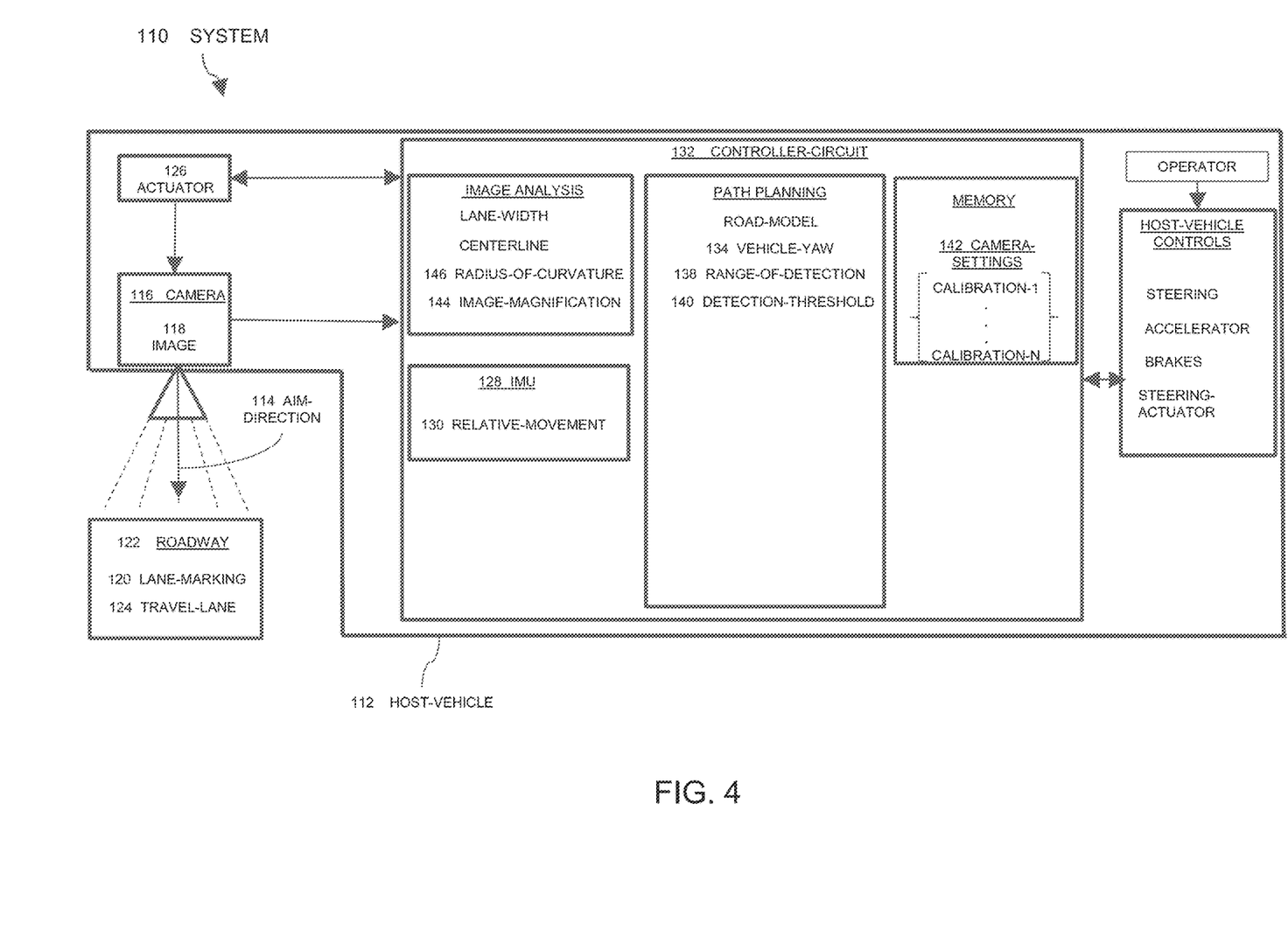
FIG. 4 is an illustration of a camera adjustment system in accordance with another embodiment.

FIG. 4 illustrates another embodiment of a camera adjustment system 110, hereafter referred to as the system 110, installed on a host-vehicle 112. The system 110 includes a camera 116 that renders an image 118 of lane-markings 120 of a roadway 122 traveled by the host-vehicle 112. The camera 116 may be mounted on the front of the host-vehicle 112, or mounted in the interior of the host-vehicle 112 at a location suitable for the camera 116 to view the area around the host-vehicle 112 through the windshield of the host-vehicle 112. The camera 116 is preferably a video type camera 116 or camera 116 that can capture images of the roadway 122 and surrounding area at a sufficient frame-rate, of ten frames per second, for example.

The image 118 may include, but is not limited to, the lane-markings 120 on a left-side and right-side of a travel-lane 124 of the roadway 122 traveled by the host-vehicle 112. The image 118 may also include the lane-markings 120 on the left-side and the right-side of an adjacent-lane to the travel-lane 124. The lane-markings 120 may include a solid-line, as is typically used to indicate the boundary of the travel-lane 124 of the roadway 122. The lane-markings 120 may also include a dashed-line, as is also typically used to indicate the boundary of a travel-lane 124 of the roadway 122. The lane-markings 120 may become non-existent or otherwise undetectable by the camera 116 for a number of reasons such as, but not limited to, fading of the lane-marking-paint, erosion of the road surface, snow or dirt on the roadway 122, precipitation or dirt on the lens of the camera 116, operational failure of the camera 116, other-vehicles or objects on the roadway 122, saturation of an imager (not shown) of the camera 116 by a light-source, etc.

The system 110 also includes an actuator 126 operable for controlling the aim-direction 114 of the camera 116 on all three axes (i.e. x, y, and z axes). The actuator 126 may be any actuator 126 suitable for controlling the aim-direction 114, and may include one or more electric stepper-motors and/or servo-motors. The actuator 126 may also include a linkage-assembly between the one or more motors and the camera 116.

The system 110 also includes one or more controller-circuits 132 in communication with the camera 116 and the actuator 126. The one or more controller-circuits 132 may include a processor (not specifically shown) such as a microprocessor or other control circuitry such as analog and/or digital control circuitry including an application specific integrated circuit (ASIC) for processing data as should be evident to those in the art. The one or more controller-circuits 132 may include a memory (not specifically shown), including non-volatile memory, such as electrically erasable programmable read-only-memory (EEPROM) for storing one or more routines, thresholds, and captured data. The one or more routines may be executed by the processor to perform steps for controlling the aim-direction 114 based on signals received from the camera 114 and the IMU 128 by the one or more controller-circuits 132 as described herein.

The one or more controller-circuits 132 are generally configured (e.g. programmed or hardwired) to determine a centerline of the travel-lane 124 based on the lane-markings 120 of the roadway 122 detected by the camera 116. That is, the image 118 detected or captured by the camera 116 is processed by the one or more controller-circuits 132 using known techniques for image-analysis to determine where along the roadway 122 the host-vehicle 112 should be operated or be steered. Vision processing technologies, such as the EYE Q® platform from Moblieye Vision Technologies, Ltd. of Jerusalem, Israel, or other suitable devices may be used. By way of example, the centerline is preferably in the middle of the travel-lane 124 traveled by the host-vehicle 112.

Figure 5:
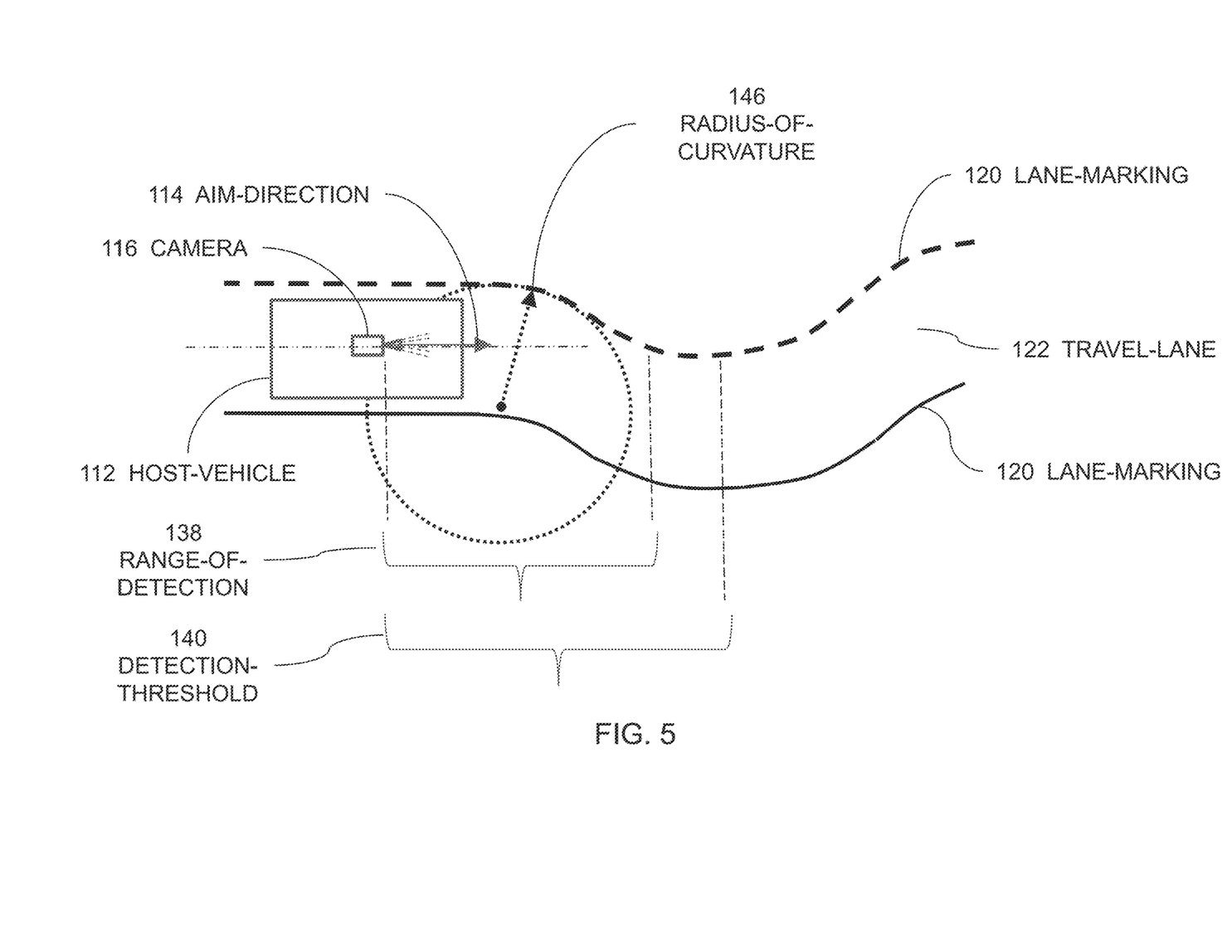
FIG. 5 is an illustration of a host-vehicle equipped with the camera adjustment system of FIG. 4 in accordance with another embodiment.

FIG. 5 illustrates a scenario where the host-vehicle 112 equipped with the system 110 is traveling in the travel-lane 124 and is approaching a curve in the roadway 122. The system 110 determines a reduction in a range-of-detection 138 of the lane-markings 120 as the lane-markings 120 appear to converge at a point closer to the host-vehicle 112 compared to that of a straight section of roadway 122. The one or more controller-circuits 132 determine whether the range-of-detection 138 of the lane-markings 120 in the image 118 is less than a detection-threshold 140. The range-of-detection 138, as used herein, is a distance away from the host-vehicle 112 at which the system 110 is able to detect the lane-markings 120 in order to determine a lane-width of the travel-lane 124. A larger range-of-detection 138 is beneficial, as the one or more controller-circuits 132 may generate and update a road-model (not specifically shown) using the lane-markings 120 to assist in controlling the host-vehicle 112 in a travel-lane 124. The detection-threshold 140 may be user defined and is preferably less than 50-meters.

Figure 6:
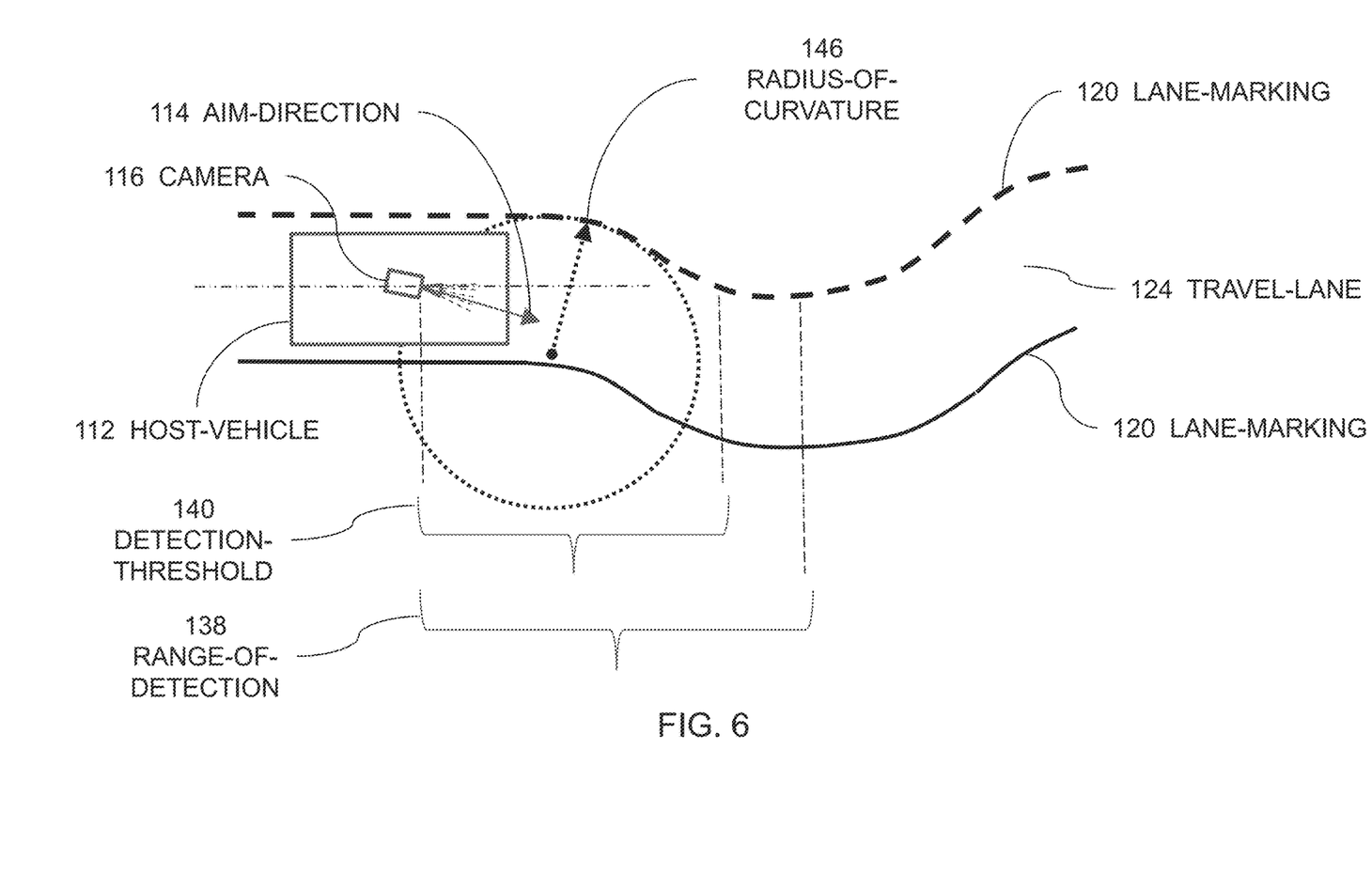
FIG. 6 is an illustration of the host-vehicle of FIG. 4 in accordance with another embodiment.

In accordance with the determination that the range-of-detection 138 is less than the detection-threshold 140, the one or more controller-circuits 132 adjusts the aim-direction 114 of the camera 116 based on the lane-markings 120, as illustrated in FIG. 6. That is, the one or more controller-circuits 132 determines that the travel-lane 124 is curving to the right of the host-vehicle 112 in the direction of travel, based on the image 118 of the lane-markings 120, and adjusts the aim-direction 114 to the right to increase the range-of-detection 138.

In one embodiment the one or more controller-circuits 132 adjusts the aim-direction 114 based on a radius-of-curvature 146 of lane-markings 120. That is, the one or more controller-circuits 132 determines the radius-of-curvature 146 of lane-markings 120 based on a polynomial-fit of the image 118 of the lane-markings 120. The one or more controller-circuits 132 may use either the left or right lane-markings 120 to determine the radius-of-curvature 146.

In another embodiment, the one or more controller-circuits 132 adjusts the aim-direction 114 until the range-of-detection 138 is greater than the detection-threshold 140. This involves an iterative process where the one or more controller-circuits 132 adjusts the aim-direction 114 an incremental amount and determines the range-of-detection 138 and repeats the process until the range-of-detection 138 is greater than the detection-threshold 140. The adjustment of the aim-direction 114 may be user defined, and preferably the one or more controller-circuits 132 adjusts the aim-direction 114 in increments of less than one-degree between the iterations of determining the range-of-detection 138. In addition, the one or more controller-circuits 132 adjusts the aim-direction 114 at a rate of less than one-degree per 100-milliseconds, which allows sufficient time for the one or more controller-circuits 132 to determine whether the range-of-detection 138 is greater than the detection-threshold 140, and provides sufficient response-time for the system 110.

In another embodiment the one or more controller-circuits 132 recalibrates camera-settings 142 based on the aim-direction 114. As will be appreciated by those in the art, the camera-settings 142 may typically be calibrated in a vehicle assembly plant where the camera's 116 extrinsic parameters that link the camera-position and orientation to a calibration-plane (i.e. a rotation matrix and translation vector) are calibrated to one or more stationary targets in the field of view of the camera 116. These calibrations typically vary based on the aim-direction 114. A plurality of calibration files may be stored in the memory (e.g. a look-up table) of the one or more controller-circuits 132 for reference by the system 110 for each unique aim-direction 114. In another embodiment, the calibrations may be calculated for each aim-direction 114 based on an initial calibration of polynomial parameters.

In another embodiment, the system 110 further includes an image-magnification feature 144, and the one or more controller-circuits 132 increases a magnification of the image 118 thereby increasing the range-of-detection 138. In the example illustrated in FIG. 4, the image-magnification feature 144 is included in the image-analysis block of the one or more controller-circuits 132. In another embodiment, the image-magnification feature 144 is included in the camera 116, such as a zoom-feature of a camera-lens.

Figure 7:
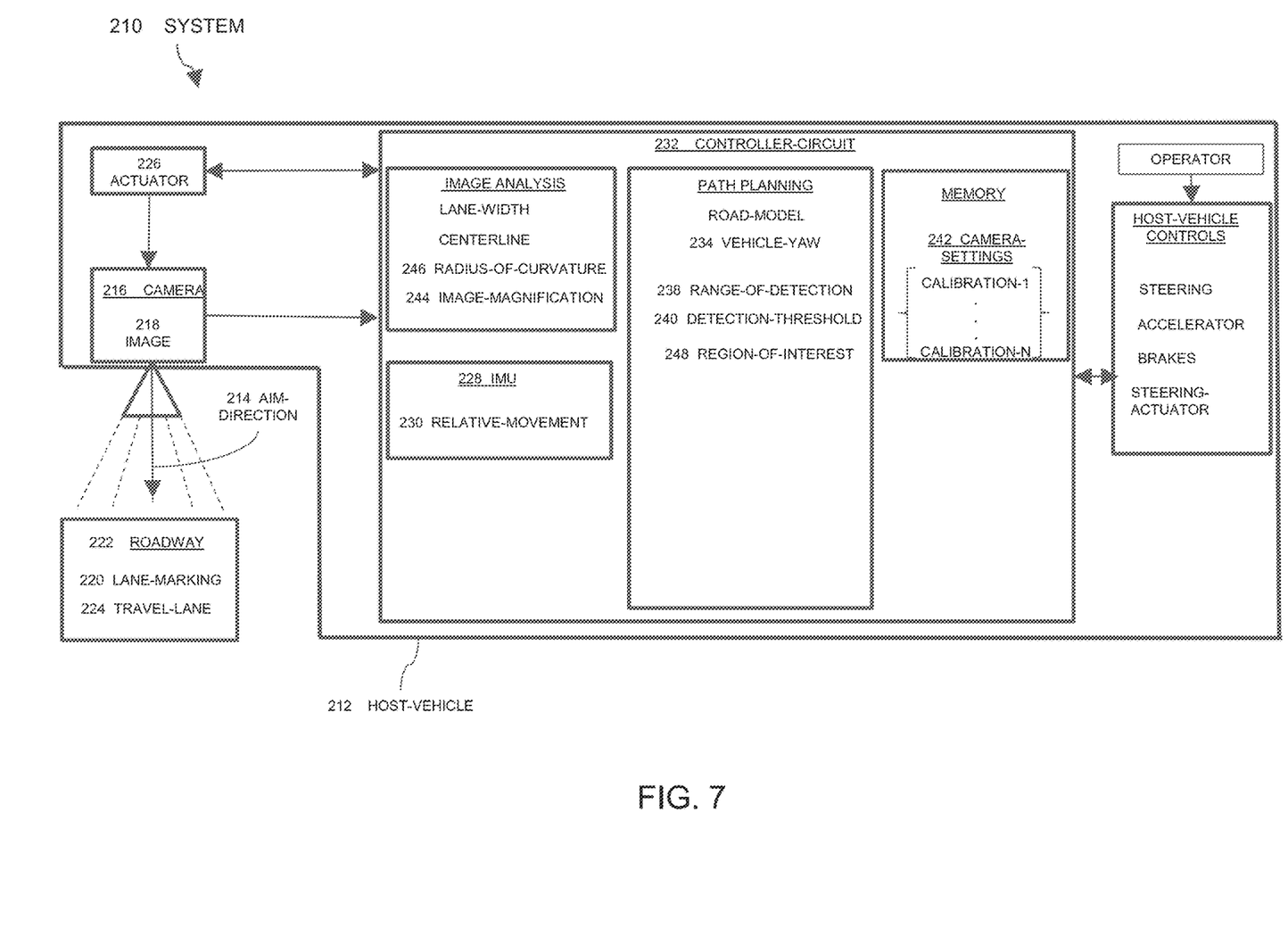
FIG. 7 is an illustration of a camera adjustment system in accordance with yet another embodiment.

FIG. 7 illustrates yet another embodiment of a camera adjustment system 210, hereafter referred to as the system 210, installed on a host-vehicle 212. The system 210 includes a camera 216 that renders an image 218 of lane-markings 220 of a roadway 222 traveled by the host-vehicle 212. The camera 216 may be mounted on the front of the host-vehicle 212, or mounted in the interior of the host-vehicle 212 at a location suitable for the camera 216 to view the area around the host-vehicle 212 through the windshield of the host-vehicle 212. The camera 216 is preferably a video type camera 216 or camera 216 that can capture images of the roadway 222 and surrounding area at a sufficient frame-rate, of ten frames per second, for example.

The image 218 may include, but is not limited to, the lane-markings 220 on a left-side and right-side of a travel-lane 224 of the roadway 222 traveled by the host-vehicle 212. The image 218 may also include the lane-markings 220 on the left-side and the right-side of an adjacent-lane to the travel-lane 224. The lane-markings 220 may include a solid-line, as is typically used to indicate the boundary of the travel-lane 224 of the roadway 222. The lane-markings 220 may also include a dashed-line, as is also typically used to indicate the boundary of a travel-lane 224 of the roadway 222. The lane-markings 220 may become non-existent or otherwise undetectable by the camera 216 for a number of reasons such as, but not limited to, fading of the lanemarking-paint, erosion of the road surface, snow or dirt on the roadway 222, precipitation or dirt on the lens of the camera 216, operational failure of the camera 216, other-vehicles or objects on the roadway 222, saturation of an imager (not shown) of the camera 216 by a light-source, etc.

The system 210 also includes an actuator 226 operable for controlling the aim-direction 214 of the camera 216 on all three axes (i.e. x, y, and z axes). The actuator 226 may be any actuator 226 suitable for controlling the aim-direction 214, and may include one or more electric stepper-motors and/or servo-motors. The actuator 226 may also include a linkage-assembly between the one or more motors and the camera 216.

The system 210 also includes one or more controller-circuits 232 in communication with the camera 216 and the actuator 226. The one or more controller-circuits 232 may include a processor (not specifically shown) such as a microprocessor or other control circuitry such as analog and/or digital control circuitry including an application specific integrated circuit (ASIC) for processing data as should be evident to those in the art. The one or more controller-circuits 232 may include a memory (not specifically shown), including non-volatile memory, such as electrically erasable programmable read-only-memory (EE-PROM) for storing one or more routines, thresholds, and captured data. The one or more routines may be executed by the processor to perform steps for controlling the aim-direction 214 based on signals received from the camera 216 and the IMU 228 by the one or more controller-circuits 232 as described herein.

The one or more controller-circuits 232 are generally configured (e.g. programmed or hardwired) to determine a centerline of the travel-lane 224 based on the lane-markings 220 of the roadway 222 detected by the camera 216. That is, the image 218 detected or captured by the camera 216 is processed by the one or more controller-circuits 232 using known techniques for image-analysis to determine where along the roadway 222 the host-vehicle 212 should be operated or be steered. Vision processing technologies, such as the EYE Q® platform from Moblieye Vision Technologies, Ltd. of Jerusalem, Israel, or other suitable devices may be used. By way of example, the centerline is preferably in the middle of the travel-lane 224 traveled by the host-vehicle 212.

Figure 8:
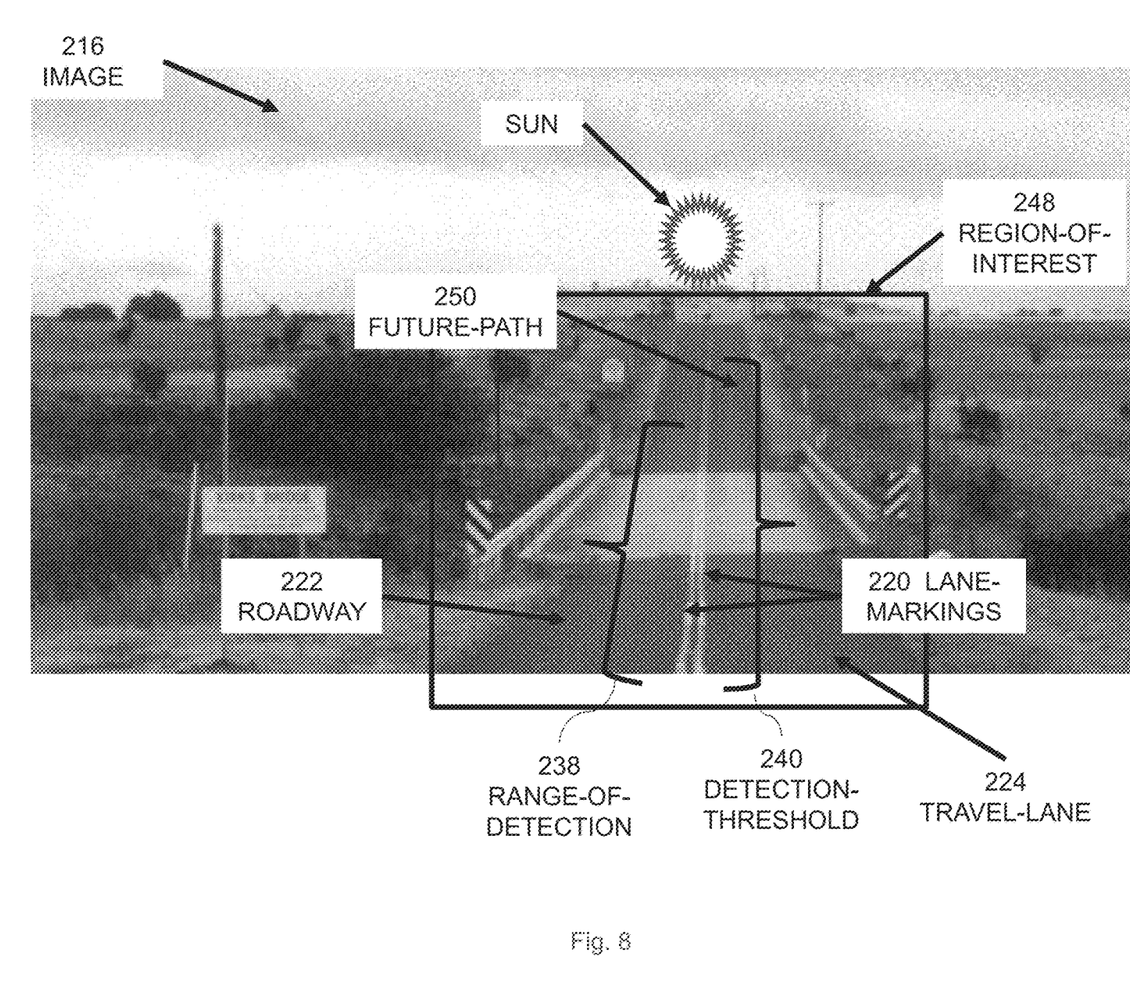
FIG. 8 is an illustration of an image from a host-vehicle equipped with the camera adjustment system of FIG. 7 in accordance with yet another embodiment.

FIG. 8 illustrates an image 216 the host-vehicle 212 equipped with the system 210 where the host-vehicle 212 is traveling in the travel-lane 224 and is approaching an incline in the roadway 122 where the Sun (i.e. a bright light-source) is poised on the horizon and positioned over the roadway 222. The one or more controller-circuits 232 determines a region-of-interest 248 within the image 218 indicative of a future-path 250 of the host-vehicle 212 (i.e. the travel-lane 224 ahead of the host-vehicle 112).

The system 210 also determines a reduction in a range-of-detection 238 of the lane-markings 220 as the light from the Sun saturates the imager of the camera 216, as will be appreciated by those in the art. The one or more controller-circuits 232 determine whether the range-of-detection 238 of the lane-markings 220 in the image 218 is less than a detection-threshold 240, as illustrated in FIG. 8. The range-of-detection 238, as used herein, is a distance away from the host-vehicle 212 at which the system 210 is able to detect the lane-markings 220 in order to determine a lane-width of the travel-lane 224. A larger range-of-detection 238 is beneficial, as the one or more controller-circuits 232 may generate and update a road-model (not specifically shown) using the lane-markings 220 to assist in controlling the host-vehicle 212 in a travel-lane 224. The detection-threshold 240 may be user defined and is preferably less than 50-meters.

Figure 9:
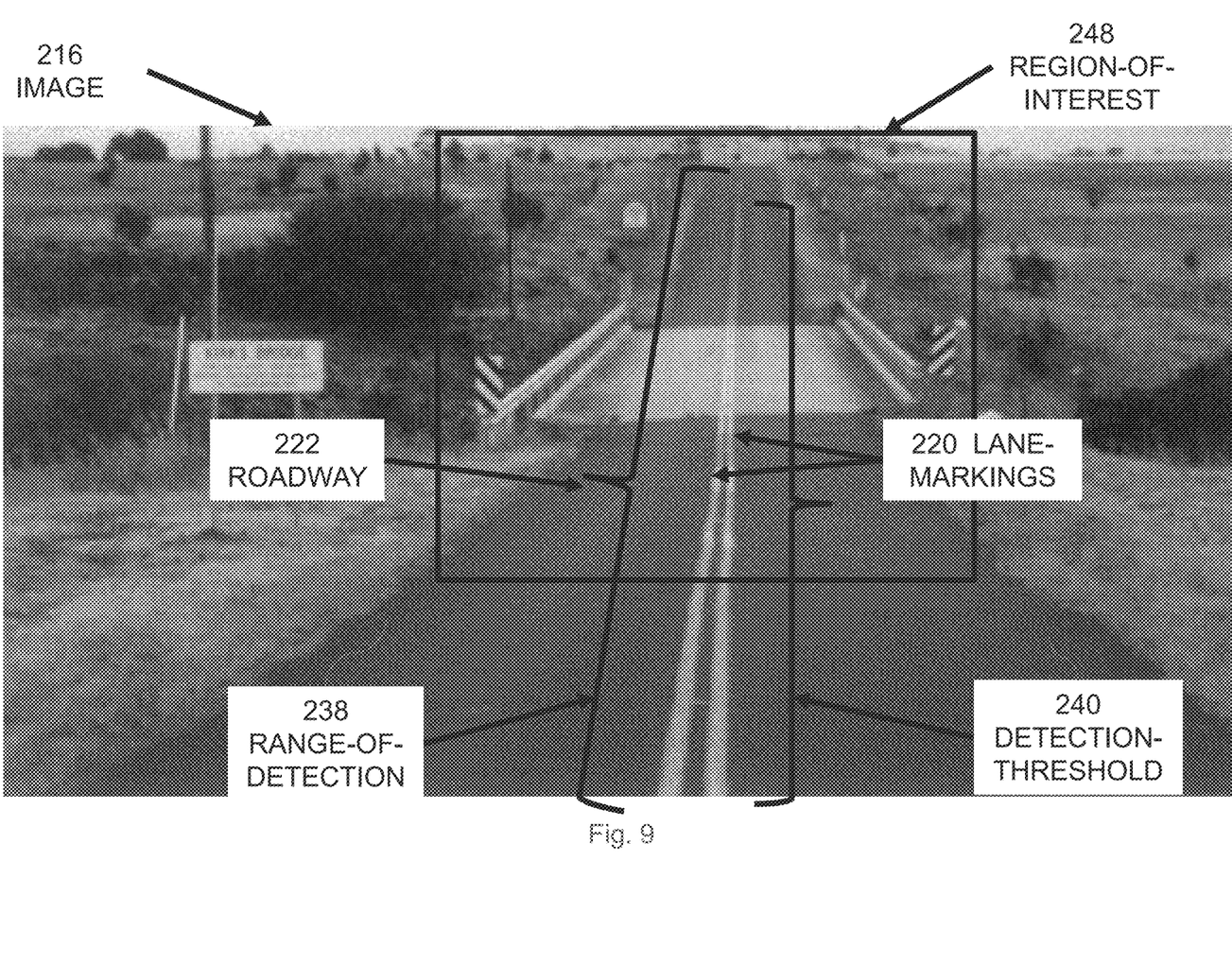
FIG. 9 is an illustration of an image from the host-vehicle of FIG. 8 in accordance with yet another embodiment.

In accordance with the determination that the range-of-detection 238 is less than the detection-threshold 240, the one or more controller-circuits 232 adjusts the aim-direction 214 of the camera 216 based on the region-of-interest 248, as illustrated in FIG. 9. That is, the one or more controller-circuits 232 adjusts the aim-direction 114 down toward the roadway 222 to increase the range-of-detection 138, thereby removing the Sun from the field-of-view of the camera 216 and inhibiting the saturation of the imager. While the example illustrated in FIGS. 8-9 are for a naturally occurring source of light, it will be appreciated that system 210 is operational when other sources of light affect the imager, such as head-lights from oncoming traffic, or reflected-light from a windshield of another-vehicle (e.g. glint).

In one embodiment, the one or more controller-circuits 232 adjusts the aim-direction 214 until the range-of-detection 238 is greater than the detection-threshold 240. This involves an iterative process where the one or more controller-circuits 232 adjusts the aim-direction 214 an incremental amount and determines the range-of-detection 238 and repeats the process until the range-of-detection 238 is greater than the detection-threshold 240. The adjustment of the aim-direction 214 may be user defined, and preferably the one or more controller-circuits 232 adjusts the aim-direction 214 in increments of less than one-degree between the iterations of determining the range-of-detection 238. In addition, the one or more controller-circuits 232 adjusts the aim-direction 214 at a rate of less than one-degree per 100-milliseconds, which allows sufficient time for the one or more controller-circuits 232 to determine whether the range-of-detection 238 is greater than the detection-threshold 240, and provides sufficient response-time for the system 210.

In another embodiment the one or more controller-circuits 232 recalibrates camera-settings 242 based on the aim-direction 214. As will be appreciated by those in the art, the camera-settings 242 may typically be calibrated in a vehicle assembly plant where the camera's 216 extrinsic parameters that link the camera-position and orientation to a calibration-plane (i.e. a rotation matrix and translation vector) are calibrated to one or more stationary targets in the field of view of the camera 216. These calibrations typically vary based on the aim-direction 214. A plurality of calibration files may be stored in the memory (e.g. a look-up table) of the one or more controller-circuits 232 for reference by the system 210 for each unique aim-direction 214. In another embodiment, the calibrations may be calculated for each aim-direction 214 based on an initial calibration of polynomial parameters.

In another embodiment, the system 210 further includes an image-magnification feature 244, and the one or more controller-circuits 232 increases a magnification of the image 218 thereby increasing the range-of-detection 238. In the example illustrated in FIG. 7, the image-magnification feature 244 is included in the image-analysis block of the one or more controller-circuits 232. In another embodiment, the image-magnification feature 244 is included in the camera 216, such as a zoom-feature of a camera-lens.

Figure 10:
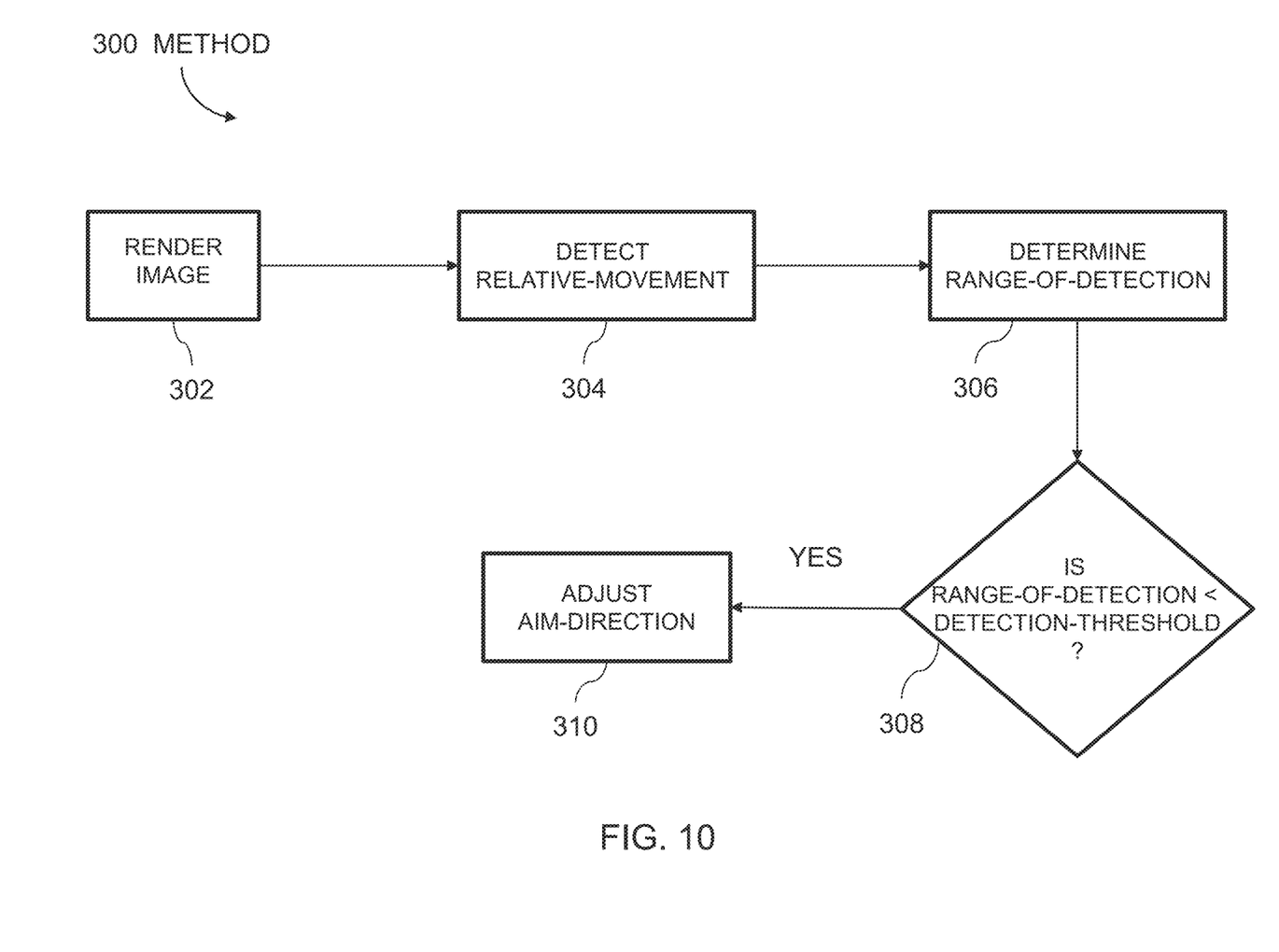
FIG. 10 is a flowchart illustrating a method of operating the camera adjustment system of FIG. 1 in accordance with yet another embodiment.

FIG. 10 is a flow chart illustrating yet another embodiment of a method 300 of operating a camera adjustment system 10, hereafter referred to as the system 10.

Step 302, RENDER IMAGE, includes rendering an image 18, with a camera 16, of lane-markings 20 of a roadway 22 traveled by a host-vehicle 12, as described above.

Step 304, DETECT RELATIVE-MOVEMENT, includes detecting relative-movement 30 of the host-vehicle 12 with an inertial-measurement-unit 28 (IMU 28).

Step 306, DETERMINE RANGE-OF-DETECTION, includes determining a range-of-detection 38 of lane-markings 20 with one or more controller-circuits 32 in communication with the camera 16, an actuator 26, and the IMU 28, as described above.

Step 308, COMPARE TO DETECTION-THRESHOLD, includes determining, with one or more controller-circuits 32, whether a range-of-detection 38 of the lane-markings 20 in the image 18 is less than a detection-threshold 40, as described above.

Step 310, ADJUST AIM-DIRECTION, includes adjusting the aim-direction 14 based on the relative-movement 30, with the actuator 26 as described above. In one embodiment, the one or more controller-circuits 32 recalibrate camera-settings 42 based on the aim-direction 14. In another embodiment the one or more controller-circuits 32 adjust the aim-direction 14 until the range-of-detection 38 is greater than the detection-threshold 40.

Figure 11:
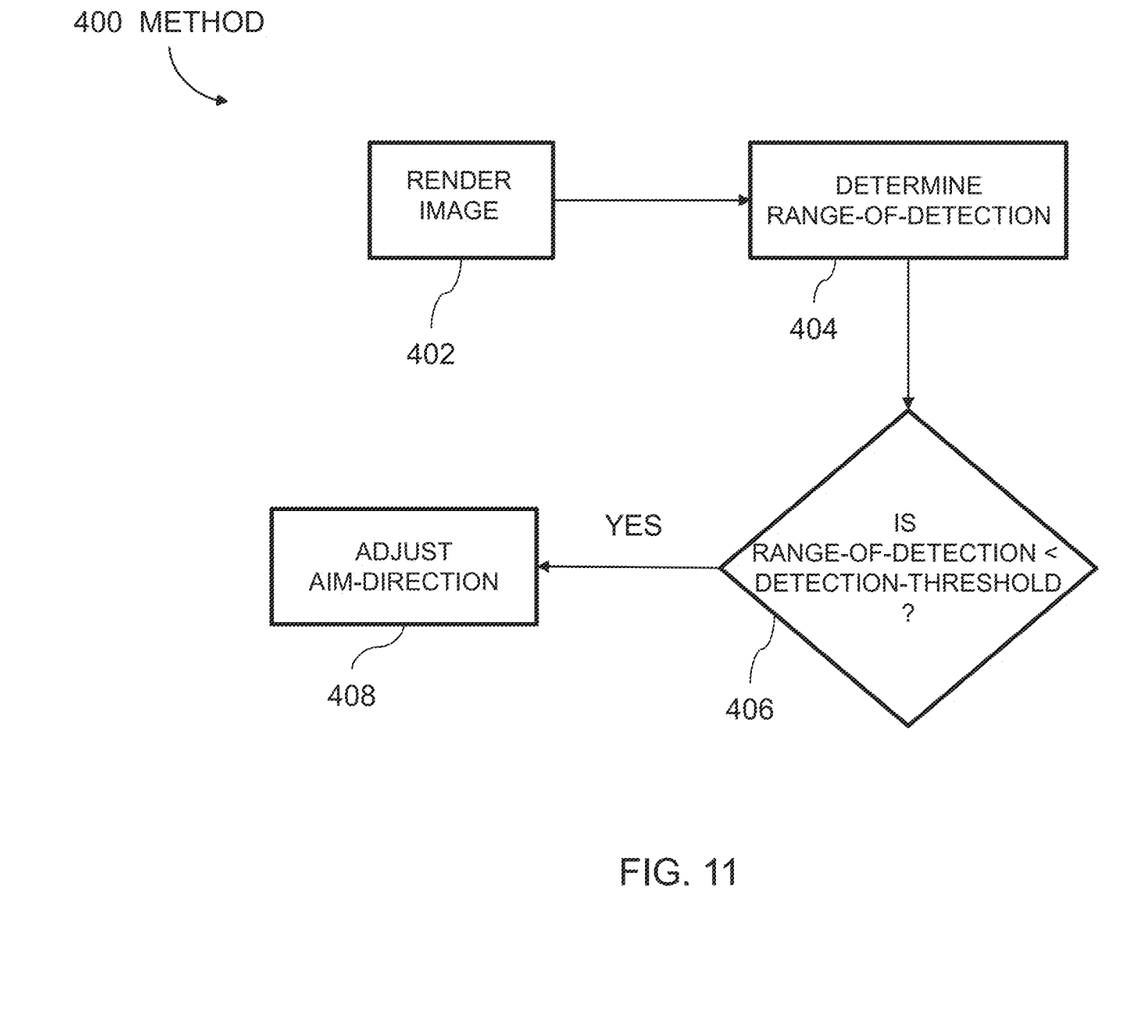
FIG. 11 is a flowchart illustrating a method of operating the camera adjustment system of FIG. 4 in accordance with yet another embodiment.

FIG. 11 is a flow chart illustrating yet another embodiment of a method 400 of operating a camera adjustment system 110, hereafter referred to as the system 110.

Step 402, RENDER IMAGE, includes rendering an image 118, with a camera 116, of lane-markings 120 of a roadway 122 traveled by a host-vehicle 112, as described above.

Step 404, DETERMINE RANGE-OF-DETECTION, includes determining a range-of-detection 138 of lane-markings 120 with one or more controller-circuits 132 in communication with the camera 116, the actuator 126, and the IMU 128, as described above.

Step 406, COMPARE TO DETECTION-THRESHOLD, includes determining, with one or more controller-circuits 132, whether a range-of-detection 138 of the lane-markings 120 in the image 118 is less than a detection-threshold 140, as described above.

Step 408, ADJUST AIM-DIRECTION, includes adjusting the aim-direction 114 based on the lane-markings 120, with the actuator 126 as described above. In one embodiment, the one or more controller-circuits 132 recalibrate camera-settings 142 based on the aim-direction 114. In another embodiment the one or more controller-circuits 132 adjust the aim-direction 114 until the range-of-detection 138 is greater than the detection-threshold 140.

Figure 12:
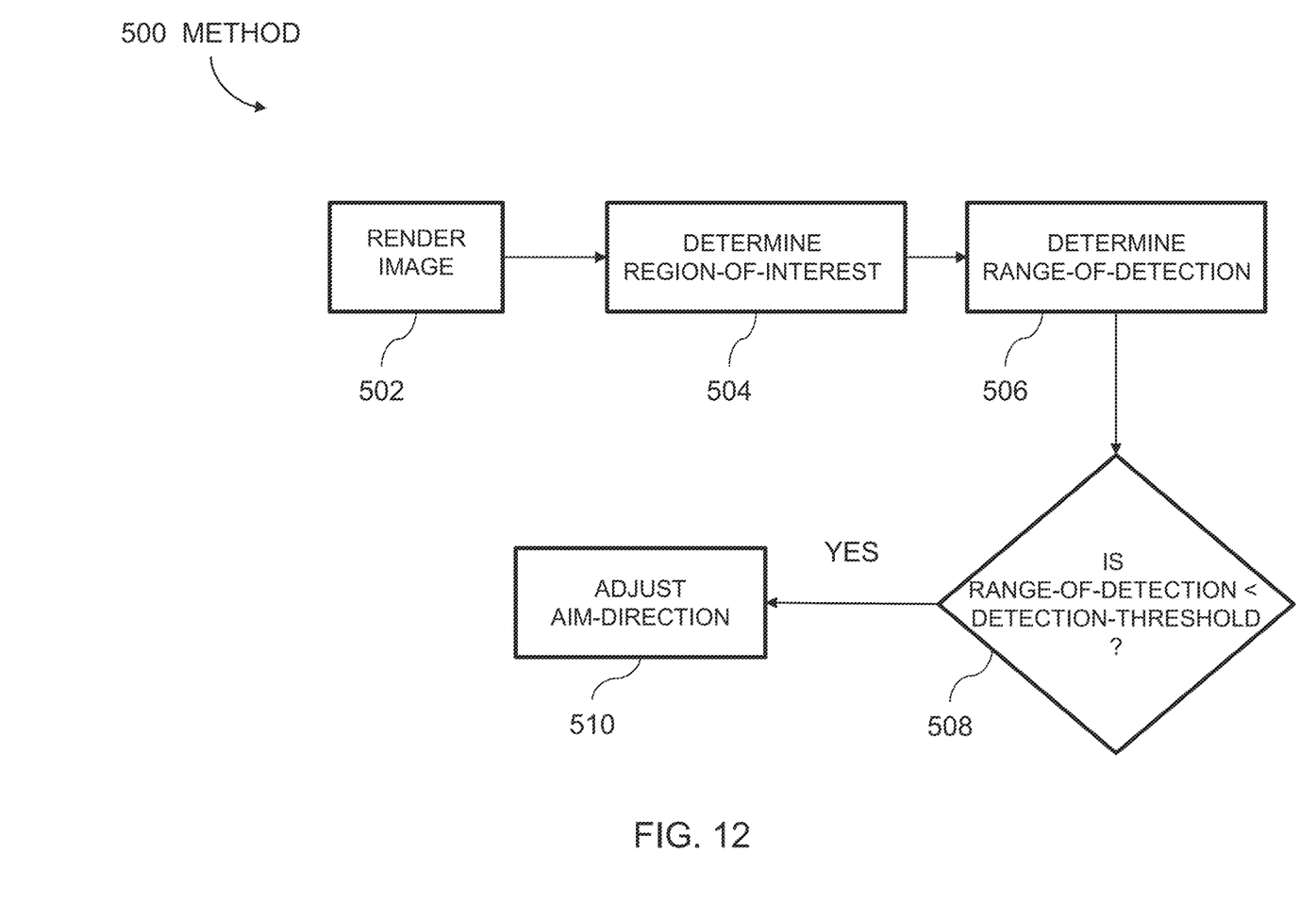
FIG. 12 is a flowchart illustrating a method of operating the camera adjustment system of FIG. 7 in accordance with yet another embodiment.

FIG. 12 is a flow chart illustrating yet another embodiment of a method 500 of operating a camera adjustment system 210, hereafter referred to as the system 210.

Step 502, RENDER IMAGE, includes rendering an image 218, with a camera 216, of lane-markings 220 of a roadway 222 traveled by a host-vehicle 212, as described above.

Step 504, DETERMINE REGION-OF-INTEREST, includes determining a region-of-interest 248 within the image 218 indicative of a future-path 250 of the host-vehicle 212, with one or more controller-circuits 232 in communication with the camera 216 and the actuator 226, as described above.

Step 506, DETERMINE RANGE-OF-DETECTION, includes determining a range-of-detection 238 of lane-markings 220 with one or more controller-circuits 232, as described above.

Step 508, COMPARE TO DETECTION-THRESHOLD, includes determining, with the one or more controller-circuits 232, whether a range-of-detection 238 of the lane-markings 220 in the image 218 is less than a detection-threshold 240, as described above.

Step 510, ADJUST AIM-DIRECTION, includes adjusting the aim-direction 214 based on region-of-interest 248, with the actuator 226 as described above. In one embodiment, the one or more controller-circuits 232 recalibrate camera-settings 242 based on the aim-direction 214. In another embodiment the one or more controller-circuits 232 adjust the aim-direction 214 until the range-of-detection 238 is greater than the detection-threshold 240.

Accordingly, a camera adjustment system 10 (the system 10), and a method 300 of operating the system 10, are provided. The system 10 is an improvement over other camera-adjustment-systems, because the system 10 controls an aim-direction 14 of the camera 16 and improved the range-of-detection 38 of lane-markings 20.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A camera adjustment system, the system comprising:
a camera, the camera rendering an image of lane-markings of a roadway traveled by a host-vehicle;
an actuator operable for controlling an aim-direction of the camera;
an inertial-measurement-unit, the inertial-measurement-unit detecting relative-movement of the host-vehicle; and one or more controller-circuits in communication with the camera, the actuator, and the inertial-measurement-unit;

the one or more controller-circuits determining whether a range-of-detection of the lane-markings in the image is less than a detection-threshold, and in accordance with the determination that the range-of-detection is less than the detection-threshold, adjusting the aim-direction based on the relative-movement; wherein the one or more controller-circuits recalibrates camera-settings based on the aim-direction.

2. The system in accordance with claim 1, wherein the one or more controller-circuits adjusts the aim-direction based on a vehicle-yaw detected by the inertial-measurement-unit.

3. The system in accordance with claim 1, wherein the one or more controller-circuits adjusts the aim-direction until the range-of-detection is greater than the detection-threshold.

4. The system in accordance with claim 1, wherein the system further includes an image-magnification feature, and the one or more controller-circuits increases a magnification of the image thereby increasing the range-of-detection.

5. A camera adjustment system, the system comprising:
a camera, the camera rendering an image of lane-markings of a roadway traveled by a host-vehicle;
an actuator operable for controlling an aim-direction of the camera;
one or more controller-circuits in communication with the camera and the actuator;
the one or more controller-circuits determining whether a range-of-detection of the lane-markings in the image is less than a detection-threshold; and
in accordance with the determination that the range-of-detection is less than the detection-threshold;
adjusting the aim-direction based on the lane-markings; wherein the one or more controller-circuits recalibrates camera-settings based on the aim-direction.

6. The system in accordance with claim 5, wherein the one or more controller-circuits adjusts the aim-direction based on a radius-of-curvature of lane-markings.

7. The system in accordance with claim 5, wherein the one or more controller-circuits adjusts the aim-direction until the range-of-detection is greater than the detection-threshold.

8. The system in accordance with claim 5, wherein the system further includes an image-magnification feature, and the one or more controller-circuits increases a magnification of the image thereby increasing the range-of-detection.

9. A camera adjustment system, the system comprising:
a camera, the camera rendering an image of lane-markings of a roadway traveled by a host-vehicle;
an actuator operable for controlling an aim-direction of the camera;
one or more controller-circuits in communication with the camera and the actuator;
the one or more controller-circuits determining a region-of-interest within the image indicative of a future-path of the host-vehicle;
the one or more controller-circuits determining whether a range-of-detection of the lane-markings in the image is less than a detection-threshold; and
in accordance with the determination that the range-of-detection is less than the detection-threshold;
adjusting the aim-direction based on the region-of-interest; wherein the one or more controller-circuits recalibrates camera-settings based on the aim-direction.

10. The system in accordance with claim 9, wherein the one or more controller-circuits adjusts the aim-direction until the range-of-detection is greater than the detection-threshold.

11. The system in accordance with claim 9, wherein the system further includes an image-magnification feature, and the one or more controller-circuits increases a magnification of the image thereby increasing the range-of-detection.

12. A method of adjusting a camera, the method comprising:
rendering an image, with a camera, of lane-markings of a roadway traveled by a host-vehicle;
detecting relative-movement of the host-vehicle with an inertial-measurement-unit; and
determining, with one or more controller-circuits in communication with the camera, an actuator, and the inertial-measurement-unit, whether a range-of-detection of the lane-markings in the image is less than a detection-threshold; and
in accordance with the determination that the range-of-detection is less than the detection-threshold;
adjusting the aim-direction with the actuator based on the relative-movement; further including the step of recalibrating camera-settings based on the aim-direction with the one or more controller-circuits.

13. The method in accordance with claim 12, further including the step of adjusting the aim-direction, with the one or more controller-circuits, until the range-of-detection is greater than the detection-threshold.

14. A method of operating a camera adjustment system, the method comprising:
rendering an image, with a camera, of lane-markings of a roadway traveled by a host-vehicle;
determining, with one or more controller-circuits in communication with the camera and an actuator:
whether a range-of-detection of the lane-markings in the image is less than a detection-threshold; and
in accordance with the determination that the range-of-detection is less than the detection-threshold; adjusting the aim-direction with the actuator based on the lane-markings; further including the step of recalibrating camera-settings based on the aim-direction with the one or more controller-circuits.

15. The method in accordance with claim 14, further including the step of adjusting the aim-direction, with the one or more controller-circuits, until the range-of-detection is greater than the detection-threshold.

16. A method of operating a camera adjustment system, the method comprising:
rendering an image, with a camera, of lane-markings of a roadway traveled by a host-vehicle;
determining, with one or more controller-circuits in communication with the camera and an actuator:
a region-of-interest within the image indicative of a future-path of the host-vehicle;
whether a range-of-detection of the lane-markings in the image is less than a detection-threshold; and
in accordance with the determination that the range-of-detection is less than the detection-threshold;
adjusting the aim-direction with the actuator based on the region-of-interest; further including the step of recalibrating camera-settings based on the aim-direction with the one or more controller-circuits.

17. The method in accordance with claim 16, further including the step of adjusting the aim-direction, with the one or more controller-circuits, until the range-of-detection is greater than the detection-threshold.

18. The system in accordance with claim 1, wherein a plurality of calibration files are stored in a memory of the one or more controller-circuits and include calibrations of the camera-settings for each unique aim-direction.

19. The system in accordance with claim 18, wherein the camera-settings include extrinsic parameters that link the camera-position and orientation to a calibration-plane.

20. The system in accordance with claim 19, wherein the extrinsic parameters include one or more of a rotation matrix and a translation vector.

21. The system in accordance with claim 1, wherein the calibrations are calculated for each aim-direction based on an initial calibration of polynomial parameters.

22. The system in accordance with claim 5, wherein a plurality of calibration files are stored in a memory of the one or more controller-circuits and include calibrations of the camera-settings for each unique aim-direction.

23. The system in accordance with claim 22, wherein the camera-settings include extrinsic parameters that link the camera-position and orientation to a calibration-plane.

24. The system in accordance with claim 23, wherein the extrinsic parameters include one or more of a rotation matrix and a translation vector.

25. The system in accordance with claim 5, wherein the calibrations are calculated for each aim-direction based on an initial calibration of polynomial parameters.

26. The system in accordance with claim 9, wherein a plurality of calibration files are stored in a memory of the one or more controller-circuits and include calibrations of the camera-settings for each unique aim-direction.

27. The system in accordance with claim 26, wherein the camera-settings include extrinsic parameters that link the camera-position and orientation to a calibration-plane.

28. The system in accordance with claim 27, wherein the extrinsic parameters include one or more of a rotation matrix and a translation vector.

29. The system in accordance with claim 9, wherein the calibrations are calculated for each aim-direction based on an initial calibration of polynomial parameters.

30. The method in accordance with claim 12, wherein a plurality of calibration files are stored in a memory of the one or more controller-circuits and include calibrations of the camera-settings for each unique aim-direction.

31. The method in accordance with claim 30, wherein the camera-settings include extrinsic parameters that link the camera-position and orientation to a calibration-plane.

32. The method in accordance with claim 31, wherein the extrinsic parameters include one or more of a rotation matrix and a translation vector.

33. The method in accordance with claim 12, wherein the calibrations are calculated for each aim-direction based on an initial calibration of polynomial parameters.

34. The method in accordance with claim 14, wherein a plurality of calibration files are stored in a memory of the one or more controller-circuits and include calibrations of the camera-settings for each unique aim-direction.

35. The method in accordance with claim 34, wherein the camera-settings include extrinsic parameters that link the camera-position and orientation to a calibration-plane.

36. The method in accordance with claim 35, wherein the extrinsic parameters include one or more of a rotation matrix and a translation vector.

37. The method in accordance with claim 14, wherein the calibrations are calculated for each aim-direction based on an initial calibration of polynomial parameters.

38. The method in accordance with claim 16, wherein a plurality of calibration files are stored in a memory of the one or more controller-circuits and include calibrations of the camera-settings for each unique aim-direction.

39. The method in accordance with claim 38, wherein the camera-settings include extrinsic parameters that link the camera-position and orientation to a calibration-plane.

40. The method in accordance with claim 39, wherein the extrinsic parameters include one or more of a rotation matrix and a translation vector.

41. The method in accordance with claim 16, wherein the calibrations are calculated for each aim-direction based on an initial calibration of polynomial parameters.

* * * * *